United States Patent [19]

Okada et al.

[11] Patent Number: 4,625,533
[45] Date of Patent: Dec. 2, 1986

[54] METHOD AND APPARATUS FOR INCREASING THICKNESS OF TUBULAR MEMBER

[75] Inventors: Kenichi Okada, Yokohama; Hiroshi Asao, Fujisawa; Hideo Yonemura, Katsuta, all of Japan

[73] Assignee: Hitachi, Ltd., Tokyo, Japan

[21] Appl. No.: 599,471

[22] Filed: Apr. 12, 1984

[51] Int. Cl.$^4$ .............................................. B21K 21/08
[52] U.S. Cl. ......................................... 72/302; 72/342
[58] Field of Search ................. 72/302, 342, 364, 128; 219/10.43, 152, 8.5

[56] References Cited

U.S. PATENT DOCUMENTS

| | | | |
|---|---|---|---|
| 1,891,338 | 12/1932 | Snell | 72/128 |
| 2,433,055 | 12/1947 | Linden et al. | 72/342 |
| 3,008,223 | 11/1961 | Frank | 72/38 |
| 3,198,926 | 8/1965 | Melmoth | 72/364 |
| 3,198,928 | 8/1965 | Allison | 72/342 |
| 3,568,490 | 3/1971 | Bohmann | 72/302 |
| 3,842,644 | 10/1974 | Biesmans | 72/342 |
| 4,218,908 | 8/1980 | Frantz et al. | 72/302 |

Primary Examiner—Lowell A. Larson
Attorney, Agent, or Firm—Antonelli, Terry & Wands

[57] ABSTRACT

A method and apparatus for increasing a thickness of a tubular member which ensures a uniform thickness increase of the tubular member and a reduction of an increase in a thickness on an inner diameter side of the tubular member. A portion of the tubular member is subjected to upsetting by applying thereto a compressive force in an axial direction of the tubular member, while the portion is being heated locally and progressively so that a surface layer of the portion of the tubular member reaches a high temperature and a thermal gradient is generated between inner and outer diameter portions of the tubular member. A loading arrangement is provided which is adapted to apply a compressive force in the tubular member in an axial direction thereof, with an annular heater being arranged around an outer circumference of the tubular member. The annular heater is capable of being moved in an axial direction of the tubular member and a control device is provided for controlling a temperature of the heater.

2 Claims, 6 Drawing Figures

METHOD AND APPARATUS FOR INCREASING THICKNESS OF TUBULAR MEMBER

The present invention relates to a method and apparatus for increasing a thickness of a tubular member and, more particularly, to a method and apparatus for increasing a thickness of a tubular member so as to ensure a uniform increase in the thickness of the member and a reduction in the increase in a thickness of an inner diameter side of the tubular member.

To increase a thickness of a tubular member, it has been proposed to perform an upsetting process by applying a compressive force to the tubular member in an axial direction thereof so as to increase the thickness of the tubular member.

A disadvantage of the above-proposed method resides in the fact that a simple compressive process method can not accomplish a uniform increase in thickness but rather such process produces an irregular deformation of the tubular member which deformation may result in a buckling and/or wrinkling of a tubular member. Moreover, when the thickness of the pipe is increased by a simple compressive process, deformation takes place throughout the entire length of the pipe thereby promoting a buckling and/or wrinkling of a tubular member.

Furthermore, when the application of a simple compressive force is utilized for the purpose of increasing the thickness of a tubular member, the increase in thickness occurs at both the outer and inner diameter sides of the tubular member. This is particularly disadvantageous when the inner diameter of the pipe is relatively small since the increase in thickness on the inner diameter side increases the proportion of the fall or reduction of a flow rate of a fluid flowing therethrough thereby causing problems such as the possible occurrence of cavitation at the reduced diameter portion and/or the development of corrosion thereat when the tubular member is used.

SUMMARY OF THE INVENTION

The aim underlying the present invention essentially resides in providing a method and apparatus for increasing a thickness of a tubular member which ensures the obtaining of a uniform thickness increase without causing any irregular deformation such as wrinkles and/or buckling, and which can also reduce the thickness increase on the inner diameter side of the tubular member.

In accordance with advantageous features of the present invention, a portion of a pipe whose diameter is to be increased is locally heated and a compressive force is applied which compresses the pipe at a predetermined rate while the portion of the pipe being heated is moved progressively in an axial direction of the pipe so that a local heating minimizes a range of deformation of the pipe due to the compressive force. Since the deformation range is minimized, it is possible to prevent irregular deformation and acheive a uniform thickness increase.

Advantageously, in accordance with further features of the present invention, the portion of the tubular member or pipe whose thickness is being increased is heated progressively and locally so that a surface layer portion of the pipe reaches a high temperature and causes a temperature gradient between the inner and outer diameter portions of the tubular member or pipe, with the compressive force being applied in axial direction of the tubular member or pipe to provide an upsetting so that a thickness increase on the inner diameter side of the pipe is reduced.

Advantageously, in accordance with method of the present invention, a tubular member is set into a support means, with the tubular member being heated by a heater means, and a compressive force is applied at a predetermined rate to the tubular member in an axial direction of the tubular member by a pressure supplier means to increase the thickness of the tubular member.

The heater means is advantageously moved in an axial direction of the tubular member at a predetermined speed so as to locally and progressively heat the tubular member, with the heated portion of the tubular member being cooled while the heater is moved to control a heating width during the heating operation.

Advantageously, the heated portion is cooled by a water spray supplied at an angle of about 45° from an opposite side to a direction of advance of the heater, and the heating width is controlled to be at most about twice a thickness of a tubular member.

In accordance with still further features of the method of the present invention, the surface temperature of the tubular member is controlled so as to cause a temperature gradient between the inner and outer diameter sides of the tubular member whereby the thickness increase on the inner diameter side of the tubular member is reduced.

The heater may, in accordance with the present invention, be constructed as a heating coil, with the surface temperature of the tubular member being controlled by a thermometer which is adapted to sense the surface temperature and a frequency current supplied to the heating coil.

In accordance with advantageous features of the apparatus of the present invention, a support member is provided having two plates positioned opposite to each other with a predetermined space being provided by rods for supporting the tubular member. The heating means is in the form of an annular coil arranged around an outer circumference of the tubular member so as to be moveable along the axial direction of the tubular member for progressively and locally heating the outer surface of the tubular member. A frequency controller is connected to the annular heating coil for controlling the frequency of the annular heating coil to heat the outer surface of the tubular member at a predetermined temperature. A sensing means in the form of, for example, a non-contact thermometer is provided on the annular heating coil and is adapted to be moved with the annular heating coil for sensing the temperature of the outer surface of the tubular member and for supplying a signal of the temperature to the frequency controller.

In order to apply the necessary compressive forces, a hydraulic stepping cylinder is secured at one of the plates of the apparatus and is adapted to apply a compressive force at a predetermined rate to the tubular member in an axial direction so as to increase the thickness of the tubular member. The cooling means are provided on the annular heating coil and are adapted to be moved with the annular heating coil for cooling the outer surface of the heated portion of the tubular member thereby controlling the heating width of the outer surface of the tubular member. A drive means is connected to the annular heating coil for moving the annular heating coil, the thermometer, and the cooling means in the axial direction of the tubular member at a predetermined speed.

The cooling means of the apparatus of the present invention contains a water spray means for spraying water onto the outer surface of the tubular member, with the water spray means controlling a quantity of the water so that the heated width by the heat means is at most twice the thickness of the tubular member.

Additionally, control means are provided having a heating controller connected to the heat means which is adapted to control a temperature of the outer surface so that a temperature gradient is caused between the inner and outer diameter sides of the tubular member.

By virtue of the features of the method and apparatus of the present invention, it is possible to obtain a uniform increase in thickness without any irregular deformations such as wrinkles and/or buckling while also reducing the thickness increase on the inner diameter side the of the tubular member.

Moreover, in accordance with the present invention, any portion of a tubular member can readily be subjected to a uniform thickness increase. Consequently, when a tubular member is subjected to a second process such as, for example, bending, barring, or a diameter enlargement, the apparent decrease in thickness due to plastic deformation can be reduced if the portions subjected to the second process is first subjected to an increase in thickness. For this reason, there is no need to use a pipe of a larger thickness and, consquently, total material cost can be reduced by some 10 to 20%. Additionally, since the orifices for spraying cooling water are provided for the heating coil, the width of the heating can be controlled advantageously by adjusting the quantity of water sprayed from the orifices. However, it is to be noted that the occurrence of an irregular deformation of a turbular member is relatively small in practice even if no cooling water orifices are provided, that is, even if no water is sprayed on the tubular member being processed.

It is also possible in accordance with the present invention, to employ a mechanical screw pressure or the like in place of the hydraulic cylinder as a means for loading the tubular member and, in such case, the overall advantageous effects of the present invention could nevertheless be obtained.

These and other objects, features, and advantages of the present invention will become more apparent from the following description when taken in connection with the accompanying drawings, which show, for the purpose of illustration only, several embodiments in accordance with the present invention.

DETAILED DESCRIPTION

Figure 1:
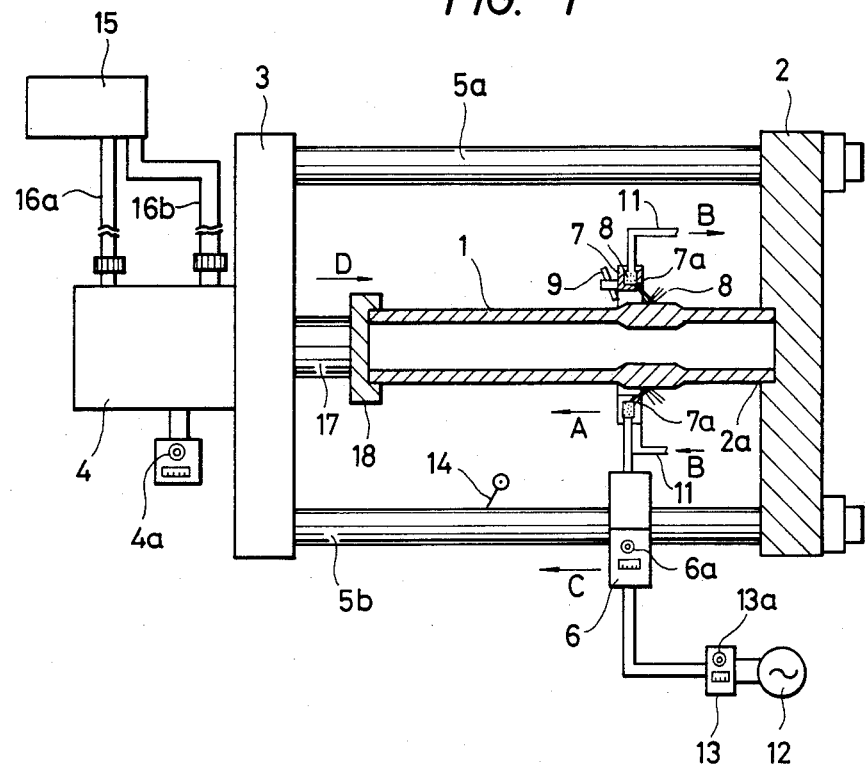
FIG. 1 is a partial cross sectional view of an apparatus for increasing a thickness of a tubular member constructed in accordance with the present invention.

Refering now to the drawings wherein like reference numerals are used throughout the various view to designate like parts and, more particularly, to FIG. 1, according to this figure, an apparatus for increasing a thickness of a workpiece such as a tubular member 1 includes a press bed equipped with a setting portion 2a for setting one of the ends of the tubular members, a plate 3 equipped on one side surface with a hydraulic stepping cylinder 4, and support rods 5a, 5b positioned opposite to each other at a predetermined spacing, with the support rods 5a, 5b being adapted to be subjected to a reaction of a compressive force. The support rod 5b also acts as a guide for a transformer 6 as it moves in an axial direction of the tubular member, and the hydraulic stepping cylinder 4 functions as a loading means capable of compressing the tubular member 1 in the axial direction.

An annular heating coil 7 is position around an outer circumference of the tubular member 1 and is adapted to heat the tubular member 1, with the coil 7 being moveable, together with the transformer 6, in an axial direction of the tubular member 1. The coil 7 is provided, around an inner peripheral surface thereof, with orifices 7a disposed on a side thereof opposite to a direction of advance indicated by the arrow A of the coil 7, with the orifices 7a being adapted to spray a portion of cooling water 8, for cooling the heating coil 7, on to the tubular member 1 at an angle of about 45°.

Figure 2:
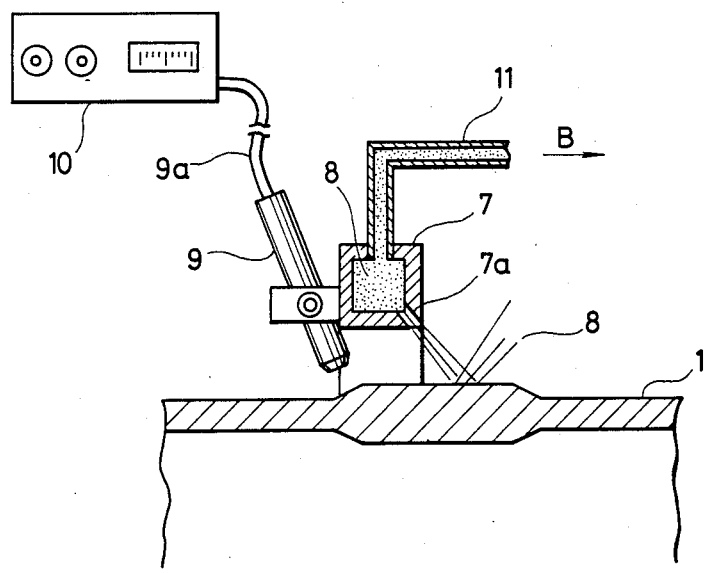
FIG. 2 is a cross sectional detail view, on an enlarged scale, of a portion of a tubular member being processed in the apparatus of FIG. 1 in proximity of a heating means.

As shown most clearly in FIG. 2, a non-contact type sensor means such as, for example, a thermometer 9 is provided for detecting or sensing a temperature of a heated portion of the tubular member 1, with the thermometer 9 being fixedly mounted on the heating coil 7. The thermometer 9 is connected to a control unit 10 by lead wires 9a so that a signal is generated when the heated portion of the tubular member 1 reaches a predetermined temperature. A cooling water pipe 11 is provided for supplying the cooling water 8 to the heating coil in the direction of the arrows B.

A high-frequency oscillator 12 generates a high frequency current which is applied to the heating coil 7, and a frequency controller 13 controls, by signals from the control unit 10, a voltage and the frequency of the high-frequency current, with the frequency controller 13 being provided with a frequency setting dial 13a. The transformer 6 controls a magnitude of the high-frequency current supplied to the heating coil 7, and is provided with a heating coil speed setting dial 6a and a driving portion equipped with a relay switch which is adapted to be turned ON by a signal from the control unit 10, and is adapted to be turned OFF by a signal from a limit switch 14. If the heating coil speed-setting dial 6a is set in advance to a predetermined speed, the transformer moves in the direction of the arrow C guided by the support rod 5a so as to move the heating coil 7 at the predetermined set speed.

The hydraulic stepping cylinder 4, forming the loading means, includes a hydraulic pressure setting dial 4a and a relay switch which is adapted to be turned ON by a signal from the control unit 10, and is adapted to be turned OFF by a signal from the limit switch 14. A hydraulic device 15 supplies a predetermined quantity of oil from a hydraulic conduit or piping 16a to the hydraulic stepping cylinder 4 with a hydraulic piping or conduit 16b being provided for returing the oil to the hydraulic device 15. A spindle 17 of the hydraulic stepping cylinder 4 applies pressure to the tubular member 1 through a support jig 18 disposed at the end thereof in a direction of the arrow D.

The limit switch 14 is adapted to generate a signal when the heating coil 7 has finished heating up to the end of the increased thickness portion and the transformer 6 has come into contact with the limit switch 14. The signal from the limit switch is sent to the relay switch of the transformer 6, to the high-frequency oscillator 12, and to the relay switch of the hydraulic stepping cylinder 4, so that the transformer 6 stops, the driving of the hydraulic stepping cylinder 4 stops, and the high-frequency oscillator stops generating the high-frequency current.

The apparatus of the present invention for increasing the thickness of the tubular member operates in the following manner:

The spindle 17 of the hydraulic stepping cylinder 4 and the transformer 6 are first retracked or moved back, and the tubular member 1 is then inserted into the annular heating coil 7, with one of the ends of the tubular member 1 being inserted into the setting portion 2a of the press head, and the other end of the tubular member 1 being held in the support jig 18 by the spindle 17 advancing in the direction of the arrow D. The transformer is then moved forward until the heating coil 7 reaches one end of the portion of the tubular member whose thickness is to be increased.

The thermometer 9 of the heating coil 7 is then set to a predetermined temperature, and the frequency of the high-frequency current is likewise set by the frequency-setting dial 13a of the frequency controller 13. The advance speed of the heating coil 7 and transformer 6 are set by the heating coil speed-setting dial 6a of the transformer 6, while the pressure of the hydraulic stepping cylinder 4 is set by the pressure-setting dial 4a of the hydraulic stepping cylinder 4. The high-frequency oscillator 12 is turned ON so that the annular heating coil 7 starts the high-frequency induction heating of the tubular member 1 and, at the same time, the cooling water is supplied from the cooling water pipe 11 to the annular heating coil 7.

When the portion of the tubular member 1, heated by the annular heating coil 7, reaches the predetermined temperature described above, the control unit 10 of the thermometer 9 generates a signal which is thereafter received by the relay switch of the hydraulic stepping cylinder 4 and by the relay switch of the driving portion of the transformer 6. Then the hydraulic stepping cylinder 4 is turned ON and pushes the spindle 17 forward by the oil supplied by the hydraulic device 15 at a predetermined pressure so that the tubular member 1 is compressed in the axial direction, that is, in the direction indicated by the arrow D, with a predetermined compressive force. The relay switch of the transformer 6 is also turned ON, the transformer 6 moves in the direction of the arrow C at the preset transformer speed, so that the heating of the tubular member 1 is continued at a predetermined temperature. In this situation the quantity of cooling water 8 sprayed from the orifices 7a of the annular heating coil 7 is adjusted so that a width of the heating is at most about twice a thickness of the tubular member 1, and a deformation range of a tubular member 1 is thus reduced.

The temperature of the tubular member 1 is sensed by the thermometer 9, and is controlled since the voltage of the high-frequency oscillator 12 or the high frequency current is controller on the bases of signals from the control unit 10. When the transformer 6 has moved forward in the direction of the arrow C so that the annular heating coil 7 has finished heating the other end portion of the tubular member 1, the transformer 6 comes into contact with the limit switch 14, whereupon movement of the transformer 6 as well as a driving of the hydraulic stepping cylinder 4 stops, and the high-frequency oscillator 12 stops generating the high-frequency current thereby completing the process of increasing the thickness of the tubular member 1. Subsequently, after the tubular member 1 has cooled, the supply of cooling water 8 is stopped, and the tubular member 1, whose thickness has thus been increased, is withdrawn from the apparatus.

As apparent from the above describe operation of the apparatus of the present invention, the compressive force is applied to the tubular member 1 while it is being heated locally by a combination of high-frequency induction heating and forced cooling so as to limit the deformation region thereby making it possible to carry out a uniform thickness increase without any irregular deformation. The depth of penetration of the current varies in accordance with the frequency of the high-frequency current and, if the penetration depth is small, a temperature gradient is produced in a thickness direction of the tubular member 1 being heated, so that deformation resistance is small on the high temperature side, i.e., the surface layer portion, of the tubular member 1, but high on the low temperature side, so that a deformation resistance gradient is produced in the thickness direction of the tubular member 1. In order to positively utilize this phenomenon, the frequency of the high frequency current used in the high-frequency induction heating is set in such a manner that a desired temperature gradient is obtained in the thickness direction of the tubular member 1. Thus, a ratio of the increase in thickness on the outer diameter side to an increase in thickness on the inner diameter side of the tubular member can be controlled and the increase in thickness on the inner diameter side can be reduced.

To demonstrate the effectiveness of the present invention, a tubular member 1, fashioned as a carbon steel pipe was employed, with the carbon steel pipe having an outer diameter of 216 mm $\theta$, a thickness of 8.6 mm, and a length of 5.5 m. The carbon steel pipe was subjected to an increase in thickness over a length of 500 mm at a thickness increase ratio, that is, thickness increase/thickness of tubular member 1, of 31%.

The conditions for the high-frequency induction heating by the annular heating coil 7 were as follows. The frequency was 9 kHz, the output was 85 kW, the heating temperature was 850° C., the speed of the annular heating coil 7 was 1 mm/min, and the pressure of the hydraulic stepping cylinder 4 was set at 53.8 kg/cm$^2$.

Figure 3:
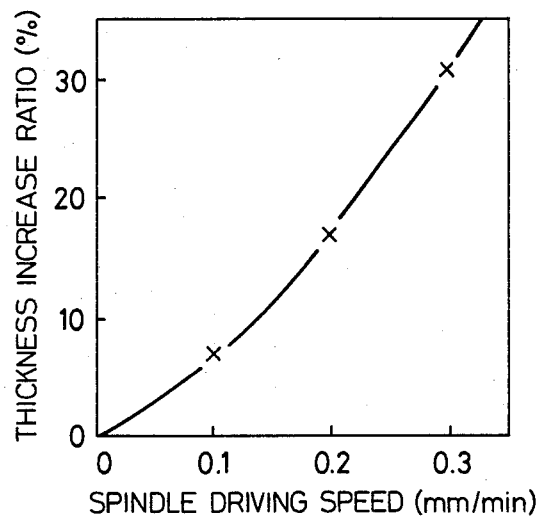
FIG. 3 is a graphical illustration of a relationship between a spindle driving speed and a thickness increase ratio at a speed at which the heating means is moved being maintained constant.

To set the driving speed for the spindle 17, preparatory tests such as illustrated FIG. 3 were carried out, with the curve in FIG. 3 representing the relationship between the driving speed of the spindle 17 and the thickness increase ratio when the speed of the heating coil 7 is at 1 mm/min. As apparent from the graphical illustration of FIG. 3, the driving speed of the spindle 17 should be set at about 0.3 mm/min in order to obtain a thickness increase ratio of 31%.

Figure 4:
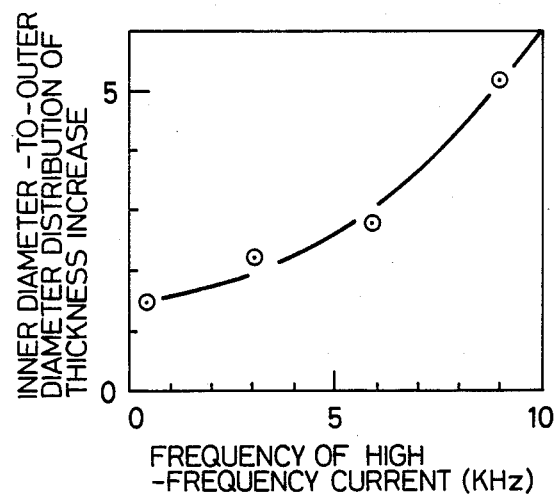
FIG. 4 is a graphical illustration of a relationship between a frequency of the high-frequency current and an inner diameter to an outer diameter distribution of a thickness increase with the speed at which the heating means is moved being maintained constant.

In order to set the frequency of the high-frequency current for the high frequency induction heating, preparatory tests such as illustrated in FIG. 4 were carried out, with the curve in FIG. 4 representing a relationship between the frequency of the high-frequency current and the inner diameter-to-outer diameter distribution of a thickness increase when the speed of the annular heating coil 7 is 1 mm/min.

Generally, in high-frequency induction heating, the higher the frequency, the less the depth of penetration of a high-frequency current and the more easy it is for the surface layer portion of the workpiece for tubular member 1 to be heated. Accordingly, a temperature gradient is produced such that the surface layered portion reaches a higher temperature. Utilizing this characteristic of high-frequency induction heating, when the frequency is increased, the temperature in proximity to the outer peripheral surface of the tubular member 1 increases, deformation resistance at that portion drops, and any deformation due to the upsetting process occurs preferentially at the portion in proximity to the outer peripheral surface of the tubular member 1. Therefore, as apparent from FIG. 4, the inner diameter-to-outer diameter distribution of thickness increase is greater if the frequency of the high-frequency current becomes higher.

For example, the inner diameter-to-outer diameter distribution of thickness increase may be approximately 5 if the thickness increase on the inner diameter side is within the range of tolerances of thickness stipulated by the Japanese Industrial Standards. The frequency corresponding to the inner diameter-to-outer diameter distribution of the thickness increase of 5 is 9 KHz and, consequently, the frequency was set to 9 KHz.

When the increase in thickness of the carbon steel pipe was carried out under the conditions described here and above using the apparatus of FIG. 1, the desired thickness increase ratio of 31% and the inner diameter-to-outer diameter distribution of thickness increase of five was achieved, and the increase in thickness was performed without any irregular deformation.

While a high-frequency current of 9 KHz was used for increasing the thickness of a carbon steel pipe of an outer diameter of 216 mm $\theta$ and a thickness of 8.6 mm to a thickness increase ratio of 31% and an inner diameter-to-outer diameter distribution of a thickness increase of the five, it is to be understood that the frequency of the high-frequency varies according to the dimensions of the tubular member 1 being subjected to the thickness increase, i.e., the outer diameter and sheet thickness, the thickness increase ratio, and the inner diameter-to-outer diameter distribution of the thickness increase. In short the frequency can be any value so long as it provides a temperature gradient between the inner and outer diameter portions of the tubular member 1 when the surface layer portion is at a high temperature.

Figure 5:
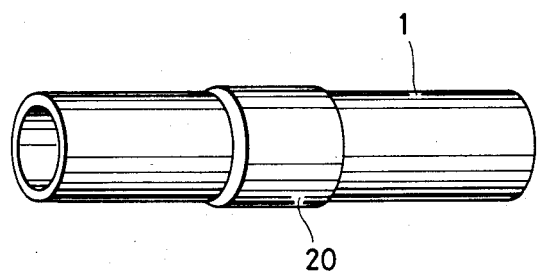
FIG. 5 is a perspective view of an example of a tubular member subjected to a thickness increase by the apparatus of FIG. 1.
Figure 6:
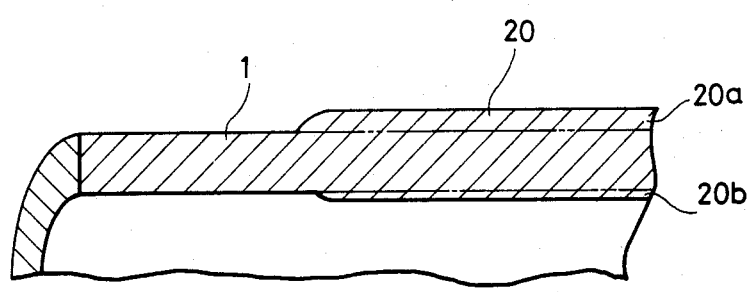
FIG. 6 is a cross sectional view on an enlarged scale, of a portion of the tubular member of FIG. 5, in a vicinity of the thickened portion.

FIG. 5 and FIG. 6 provide an example of a tubular member which has been subjected to an increase in thickness by the apparatus of FIG. 1 and, according to these figures, the tubular member 1 is provided with a thickened portion 20 having a thickened portion 20a on an outer diameter side and a thickened portion 20b on the inner diameter side. The thickness ratio of 31% of the thickened portion 20 is uniform and is completely devoid of any irregular deformation. Additionally, the thickness increase on the inner diameter side is small. The inner diameter-to-outer diameter distribution of the thickness increase is equal to five.

While we have shown and described only one embodiment in accordance with the present invention, it is understood that the same is not limited thereto but is susceptible of numerous changes and modifications as known to one having an oridinary skill in the art and we therefore do not wish to be limited to the details shown and described herein, but intend to cover all such modifications as are encompassed by the scope of the appended claims.

We claim:

1. A method of increasing a thickness of a tubular member, the method comprising the steps of:
    disposing a tubular member into a support means;
    heating the tubular member by a heating means;
    applying a compressive force at a predetermined rate to the tubular member in an axial direction of the tubular member by a pressure means to increase the thickness of the tubular member;
    moving the heating means in an axial direction of the tubular member at a predetermined spaced to locally and progressively heat the tubular member;
    cooling the heated portion of the tubular member while the heating means is moved to control a heating width of said heating means, with the heating width being controlled to be at most about twice a thickness of the tubular member; and
    controlling a surface temperature of the tubular member so as to cause a thermal gradient between inner and outer diameter sides of the tubular member thereby reducing an increase in a thickness of the inner diameter side of the tubular member.

2. A method of increasing a thickness of a tubular member, the method comprising the steps of:
    disposing a tubular member into a support means;
    heating the tubular member by a heating means;
    applying a compressive force at a predetermined rate to the tubular member in an axial direction of the tubular member by a pressure means to increase the thickness of the tubular member;
    moving the heating means along an axial direction of the tubular member at a predetermined speed to locally and progressively heat the tubular member;
    cooling a heat portion of the tubular member so as to control a heating width of the tubular member such that a heating width is at most about twice a thickness of the tubular member; and
    controlling a surface temperature of the tubular member so as to cause a thermal gradient between inner and outer diameter sides of the tubular member.

* * * * *